(12) United States Patent
Morrison et al.

(10) Patent No.: US 6,503,983 B1
(45) Date of Patent: Jan. 7, 2003

(54) STABLE N-OXYL RADIAL ASSISTED MINI EMULSION POLYMERIZATION

(75) Inventors: Bradley Ronald Morrison, Mannheim (DE); Klemens Mathauer, Ludwigshafen (DE); Michael Fischer, Ludwigshafen (DE); Yvon Durant, Eppelheim (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/446,119

(22) PCT Filed: Jun. 18, 1998

(86) PCT No.: PCT/EP98/03697

§ 371 (c)(1),
(2), (4) Date: Dec. 27, 1999

(87) PCT Pub. No.: WO99/00426

PCT Pub. Date: Jan. 7, 1999

(30) Foreign Application Priority Data

Jun. 27, 1997 (DE) .......................... 197 27 505
Aug. 15, 1997 (DE) .......................... 197 35 225

(51) Int. Cl.[7] .............. C08F 4/00; C08F 2/22
(52) U.S. Cl. ............ 524/804; 526/204; 526/220
(58) Field of Search ............. 526/204, 220; 524/804

(56) References Cited

U.S. PATENT DOCUMENTS

| | | |
|---|---|---|
| 4,670,131 A | 6/1987 | Ferrell |
| 5,322,960 A | 6/1994 | Sakamoto et al. |
| 5,412,047 A | 5/1995 | Georges et al. |
| 5,852,140 A * | 12/1998 | George et al. ............. 526/82 |

FOREIGN PATENT DOCUMENTS

| | | |
|---|---|---|
| CN | 1 052 847 | 7/1991 |
| DE | 1 618 141 | 10/1970 |
| DE | 197 04 714 | 7/1997 |
| DE | 196 51 307 | 6/1998 |
| EP | 0 135 280 | 3/1985 |
| GB | 1127127 | 9/1968 |
| WO | WO 96/24620 | 8/1996 |

OTHER PUBLICATIONS

C.J. Hawker, Trends in Polymer Science, vol. 4, No. 6, pps. 183–188, "Advances in 'Living' Free–Radical Polymerization: Architectural and Structural Control", Jun., 1996.

S.A.F. Bon, et al., Macromolecules, vol. 30, No. 2, pps. 324–326, "Controlled Radical Polymerization in Emulsion", 1997.

* cited by examiner

Primary Examiner—David W. Wu
Assistant Examiner—Kelechi C. Egwim
(74) Attorney, Agent, or Firm—Oblon, Spivak, McClelland, Maier & Neustadt, P.C.

(57) ABSTRACT

A process of free-radically initiated aqueous emulsion polymerization, in which polymerization is conducted in the presence of a stable N-oxyl radical and the diameter of the monomer droplets in disperse distribution in the aqueous medium is $\leq 500$ nm.

9 Claims, No Drawings

STABLE N-OXYL RADICAL ASSISTED MINI EMULSION POLYMERIZATION

The present invention relates to a process of free-radically initiated aqueous emulsion polymerization for preparing an aqueous polymer dispersion, where compounds having at least one ethylenically unsaturated group (monomers) are emulsified in an aqueous medium by means of dispersants and are polymerized by means of a free-radical polymerization initiator in the presence of a N-oxyl radical (a compound having at least one

group) which is derived from a secondary amine which carries no hydrogens on the α carbons (in other words, the N-oxyl groups are derived from corresponding secondary amino groups), to form an aqueous polymer dispersion. In this document, the abovementioned N-oxyl radicals will be referred to as stable N-oxyl radicals.

Aqueous polymer dispersions are fluid systems comprising, as the disperse phase, polymer particles in stable (storage stability in general $\geq 24$ h, normally $\geq 2$–3 days, usually $\geq 1$ week) disperse distribution in an aqueous dispersion medium. The number-average diameter of the polymer particles is generally from 0.01 to 1 μm.

Like polymer solutions when the solvent is evaporated, aqueous polymer dispersions have the property, when the aqueous dispersion medium evaporates, of forming polymer films, which is why aqueous polymer dispersions are widely employed in direct form as binders, for example for paints or compositions for coating leather.

In many cases, however, the dispersed polymer is also separated off by coagulation and used as a constituent in polymer blends to modify the mechanical properties. For this purpose, the polymer separated off from the aqueous polymer dispersion is extruded together, for example, with other thermoplastics, with or without the customary additives such as dyes, pigments, lubricants, stabilizers or fillers.

Aqueous polymer dispersions are mostly prepared by free-radically initiated aqueous emulsion polymerization of compounds having at least one ethylenically unsaturated group at below 100° C. In this case, the monomers to be polymerized, which are mainly of only little solubility in water, are emulsified in the aqueous medium without any great effort, for example by customary stirring, with the addition of dispersant and are polymerized by the action of free-radical polymerization initiators.

The free-radical polymerization initiators are usually water-soluble peroxides, hydroperoxides and/or azo compounds which, above a certain temperature, generally $\leq 100°$ C., dissociate into reactive radicals which trigger the polymerization.

The term emulsion expresses the fact that the monomers and the water are present as a system of two liquids in more or less fine distribution and with little mutual solubility. The phrase aqueous emulsion expresses the fact that the aqueous phase forms the continuous phase. To prepare an aqueous monomer emulsion normally requires the addition of dispersants (for example, Ullmanns Encyklopädie der technischen Chemie, Vol. 10, 4th Edition, Verlag Chemie, Weinheim (1975), p. 449), which prevent the direct combination of two monomer droplets which happen to collide in the aqueous emulsion, and which ensure the stability of the resulting aqueous polymer dispersion.

As a result of the low dispersion effort, the aqueous monomer emulsion employed in connection with the free-radical aqueous emulsion polymerization usually consists predominantly of monomer droplets with a diameter >1 μm.

Like all free-radically initiated polymerizations of compounds having at least one ethylenically unsaturated group, the process of free-radically initiated aqueous emulsion polymerization also has the disadvantage that the molecular weight of the polymer chains does not normally increase with the degree of conversion and that the resulting polymer chains are not generally of uniform molecular weight. In other words, and in terms of its molecular weight, the polymer obtainable is generally not monodisperse but usually has a polydispersity index PDI in this regard of $\geq 2$ (PDI=$\overline{M}_w/\overline{M}_n$, where $\overline{M}_w$=weight-average molecular weight and $\overline{M}_n$=number-average molecular weight), which is attributed in particular to termination reactions as a consequence of the irreversible combination of growing free-radical polymer chain ends.

Another disadvantage of free-radically initiated aqueous emulsion polymerization is that a change made during polymerization to the monomers that are to be polymerized leads generally not to segmented copolymers (block polymers) but normally, at best, to dispersed core-shell polymer particles with a core composed of one type of monomer and a shell composed of the other type of monomer, the bond between core and shell being primarily not chemical but merely physical.

TRIP Vol. 4, No. 6, June 1996, p. 183 ff., U.S. Pat. No. 5,322,912, WO 96/24620, U.S. Pat. No. 4,581,429, U.S. Pat. No. 5,412,047, EP-A 135 280 and Prior Application DE-A 19602539 disclose that conducting free-radically initiated polymerizations at above 100° C. in the presence of a stable N-oxyl radical (that is, one essentially devoid of an initiating action) allows a certain degree of control of the free-radically initiated polymerization.

The mechanism on which the action is based is presumed to be that the stable N-oxyl radicals do not irreversibly terminate but merely temporarily block reactive radical ends of a growing polymer chain at elevated temperatures. The result of this is a reduction in the steady-state concentration of growing free-radical polymer chain ends, thereby reducing the possibility for the irreversible termination of the chain growth through the combination of two growing polymer chain ends. This leads on average to polymer chains which grow in (ideally linear) proportion with the polymerization conversion. The result of the latter is an average molecular weight which grows in (ideally linear) proportion with the polymerization conversion, with the resulting polymer having a polydispersity index of 1.

According to U.S. Pat. No. 5,322,912, column 10, line 65 et seq. suitable reaction media for a controlled free-radically initiated polymerization of this kind include an emulsion. Further details regarding the implementation of such a free-radically initiated emulsion polymerization are not given by U.S. Pat. No. 5,322,912. The same applies to DE-A 19602539. The only recommendation made in U.S. Pat. No. 5,412,047, column 18, lines 54 et seq. for the case where free-radically initiated polymerization takes place in a multiphase system, as is the case with the free-radically initiated aqueous emulsion polymerization, is to use stable N-oxyl radicals which are of particularly low solubility in water.

The availability of an easy-to-implement, controlled, free-radically initiated aqueous emulsion polymerization for preparing an aqueous polymer dispersion would be advantageous insofar as it would enable the molecular weight of the resulting polymer, present in disperse distribution, to be adjusted in a controlled manner. This controlled establishment determines, for example, the cohesion and adhesion of the resulting film of the aqueous polymer dispersion. In general there is a rise in the degree of cohesion as the molecular weight increases, whereas a decreasing molecular weight generally promotes the surface tack of the film. Moreover, the possibility of controlled establishment opens up direct access to aqueous dispersions of tailor-made block copolymers, since the free-radical polymer chain ends are not destroyed by combination but only blocked reversibly. In other words, following the consumption of a first type of monomer, the polymerization can be continued with the addition of further types of monomer.

To prepare an aqueous polymer dispersion by controlled initiated aqueous emulsion polymerization, Macromolecules 1997, 30, pp. 324–326 recommends implementing said polymerization such that a preformed aqueous polymer dispersion (seed latex) is charged to a polymerization vessel and that to this initial charge there are added the monomers to be polymerized and also a hydrophobic compound which under the action of heat dissociates into a stable N-oxyl radical and a free-radical partner which initiates the polymerization. The reaction mixture is then left at room temperature in order to enable both the monomers to be polymerized and the hydrophobic compound to diffuse into the seed polymer particles (swelling). After swelling has taken place, the temperature is raised (>100° C.) in order to carry out polymerization under superatmospheric pressure. Disadvantages of this procedure are that it requires the prior preparation of the comparatively complex hydrophobic compound, and the extremely slow swelling process. Furthermore, it absolutely requires the prior preparation of a seed latex.

It is an object of the present invention to provide a more advantageous procedure of controlled free-radically initiated aqueous emulsion polymerization for preparing aqueous polymer dispersions.

We have found that this object is achieved by a process of free-radically initiated aqueous emulsion polymerization for preparing an aqueous polymer dispersion, where compounds having at least one ethylenically unsaturated group are emulsified in an aqueous medium by means of dispersants and are free-radically polymerized in the presence of a stable N-oxyl radical, which comprises using a mixture composed of a) the compounds having at least one ethylenically unsaturated group, together with at least one free-radical polymerization initiator and at least one stable N-oxyl radical, or b) the compounds having at least one ethylenically unsaturated group, and at least one compound which under the action of heat breaks down into a stable N-oxyl radical and into a free-radical partner which initiates the polymerization, to produce an aqueous emulsion whose disperse phase consists predominantly of droplets with a diameter ≦500 rim and polymerizing the aqueous emulsion by raising the temperature.

Stable N-oxyl radicals suitable in accordance with the invention are all those specified in EP-A 135 280, Prior Application DE-A 19651307, U.S. Pat. No. 5,322,912, U.S. Pat. No. 4,581,429, WO 96/24620, U.S. Pat. No. 5,412,047 and Prior Application DE-A 19602539.

Examples of such suitable, stable N-oxne radicals which derive from a secondary amine are those of the formula I

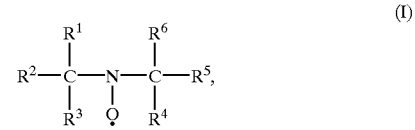

where $R^1, R^2, R^5$ and $R^6$=the same or different straight- or branched-chain, substituted or unsubstituted alkyls and $R^3$ and $R^4$=the same or different straight- or branched-chain, substituted or unsubstituted alkyls, or $R^3CNCR^4$=a substituted or unsubstituted cyclic structure.

Particularly suitable compounds I are those specified in EP-A 135 280, Prior Application DE-A 19651307, U.S. Pat. No. 5,322,912, U.S. Pat. No. 5,412,047, U.S. Pat. No. 4,581,429, DE-A 16 18 141, CN-A 1052847, U.S. Pat. No. 4,670,131, U.S. Pat. No. 5,322,960 and Prior Application DE-A 19602539.

Examples thereof are those stable N-oxyl radicals of the formula I in which $R^1$, $R^2$, $R^5$ and $R^6$ are (identical or different) methyl, ethyl, n-propyl, isopropyl, n-butyl, isobutyl, tert-butyl, linear or branched pentyl, phenyl or substituted groups thereof and $R^3$ and $R^4$ are (identical or different) methyl, ethyl, n-propyl, isopropyl, n-butyl, isobutyl, tert-butyl, linear or branched pentyl, substituted groups thereof or together with CNC the cyclic structure

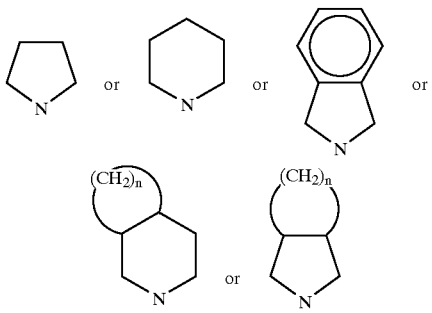

where n is an integer from 1 to 10 (in many cases from 1 to 6), including substituted forms of such cyclic structures. Typical examples are 2,2,6,6-tetramethyl-1-oxylpiperidine, 2,2,5,5-tetramethyl-1-oxylpyrrolidine and 4-oxo-2,2,6,6-tetramethyl-1-oxylpiperidine.

The stable N-oxyl radicals can be prepared from the corresponding secondary amines by oxidation, for example with hydrogen peroxide. In general they can be prepared as the pure substance.

Stable N-oxyl radicals which are suitable in accordance with the invention are, for example, those whose molal solubility in water at 25° C. and 1 bar is $\leq 10^{-1}$ mol/kg. In other words, this molar solubility can also be $\leq 10^{-3}$ or $\leq 10^{-4}$ and/or $\leq 10^{-5}$ or $\leq 10^{-6}$ mol/kg.

Stable N-oxyl radicals suitable in accordance with the invention include, in particular, carboxylated, phosphonated, sulfonated and/or hydroxylated piperidine or pyrrolidine N-oxyls and di-N-oxyls of the following formulae II to IX:

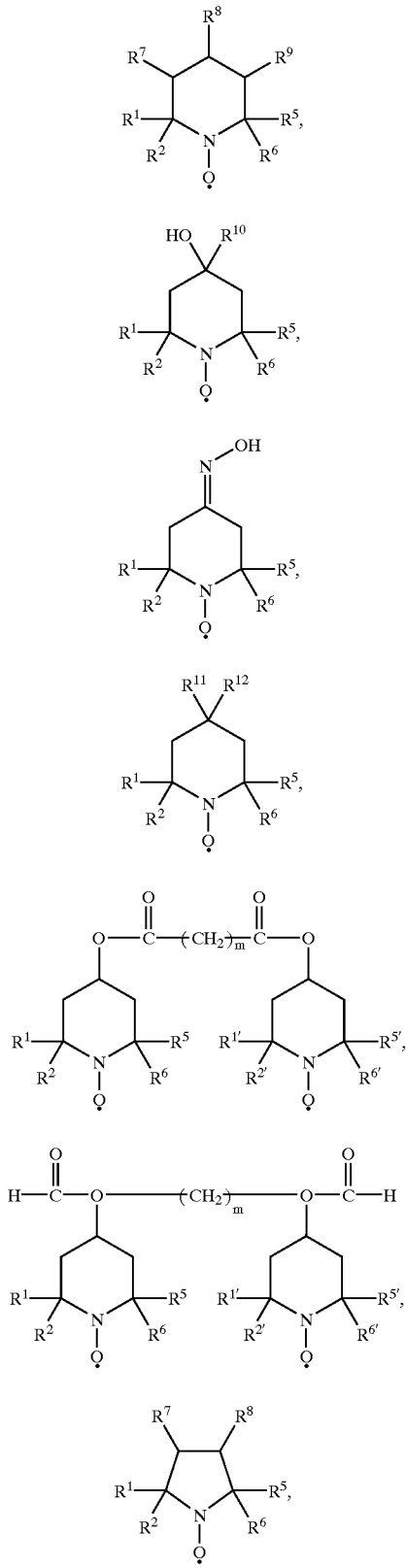

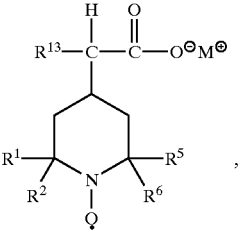

where m=from 2 to 10, $R^7, R^8, R^9$=independently of one another

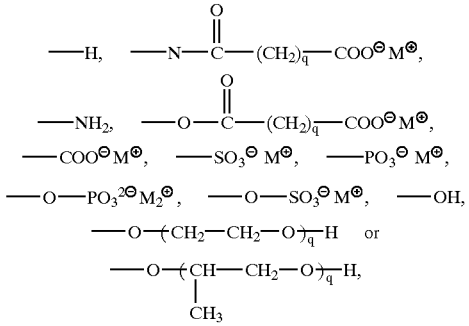

with the proviso that at least one of the substituents $R^7$, $R^8$ and $R^9$ present is different from hydrogen and $M^\oplus$ is a hydrogen ion or an alkali metal ion (especially $K^\oplus$ or $Na^\oplus$), q=an integer from 1 to 10, $R^{1'}, R^{2'}, R^{5'}, R^{6'}$=independently of one another and independently of $R^1$, $R^2$, $R^5$ and $R^6$ the same groups as $R^1$, $R^{10}$ = $C_1$–$C_4$—alkyl, —CH═CH$_2$, —C≡CH, —CN,

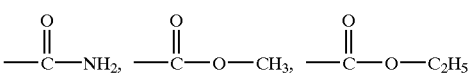

$R^{11}$=an organic radical with at least one primary, secondary (eg. —NHR$^1$) or tertiary amino group (eg. —NR$^1$R$^2$) or at least one ammonium group —N$^\oplus$R$^{14}$R$^{15}$R$^{16}$X$^\ominus$, where X$^\ominus$=F$^\ominus$, Cl$^\ominus$, Br$^\ominus$, HSO$_4^\ominus$, SO$_4^{2\ominus}$, H$_2$PO$_4^\ominus$, HPO$_4^{2\ominus}$ or PO$_4^{3\ominus}$ and $R^{14}$, $R^{15}$, $R^{16}$ independently of one another are organic radicals (eg. independently of one another and independently of $R^1$ the same groups as $R^{1)}$, $R^{12}$=independently of $R^{11}$ the same groups as $R^{11}$ or —H, —OH, $C_1$–$C_4$-alkyl, —COO$^\ominus$M$^\oplus$, —C≡CH,

—C(O)—NH$_2$, —C(O)—O—CH$_3$, —C(O)—O—C$_2$H$_5$ hydroxy-substituted $C_1$–$C_4$-alkyl (eg. hydroxyethyl or hydroxypropyl), or $R^{11}$, $R^{12}$=together the oxygen of a carboxyl group and

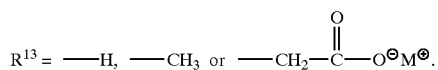

$R^{13} =$ —H, —CH$_3$ or —CH$_2$—C(=O)—O$^\ominus$M$^\oplus$.

Preferably, $R^1=R^2=R^5=R^6=R^{1'}=R^{2'}=R^{5'}=R^{6'}=$—CH$_3$.

If the stable N-oxyl radical has an acidic or basic group as functional groups, the solubility of the N-oxyl radical in the aqueous polymerization medium can be adjusted by varying its pH.

Typical examples of stable N-oxyl radicals which are suitable in accordance with the invention are 4-hydroxy-2,2,6,6-tetramethyl-1-oxylpiperidine, 4-hydroxy-2,6-diphenyl-2,6-dimethyl-1-oxylpiperidine, 4-carboxy-2,2,6,6-tetramethyl-1-oxylpiperidine, 4-carboxy-2,6-diphenyl-2,6-dimethyl-1-oxylpiperidine, 3-carboxy-2,2,5,5-tetramethyl-1-oxylpyrrolidine, 3-carboxy-2,5-diphenyl-2,5-dimethyl-1-oxylpyrrolidine and the sodium or potassium salt of the sulfuric monoester of 4-hydroxy-2,2,6,6-tetramethyl-1-oxylpiperidine.

The preparation of 3-carboxy-2,2,5,5-tetramethyl-1-oxylpyrrolidine, for example, is given in Romanelli, M.; Ottaviani, M. F.; Martini, G.; Kevan, L., JPCH J: Phys. Chem., EN, 93, 1, 1989, pp. 317–322.

Compounds (VI) and (VII) can be obtained in accordance with U.S. Pat. No. 4,665,185 (eg. Ex. 7) and DE-A 19510184.

Other suitable, typical examples are:

Sunamoto, Junzo; Akiyoshi, Kuzunari, Kihara, Tetsuji; Endo, Masayuki, BCS JA 8, Bull, Chem. Soc. Jpn., EN, 65, 4, 1992, pp. 1041–1046;

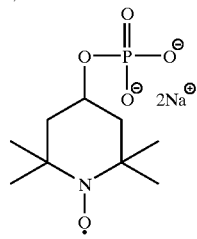

Beilstein Registry Number 6926369
(C$_{11}$H$_{22}$N$_3$O$_2$);

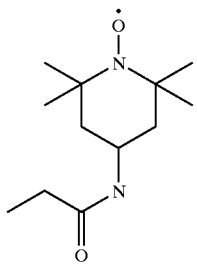

Beilstein Registry Number 6498805
(4-amino-2,2,6,6-tetramethyl-1-oxyl-piperidine);

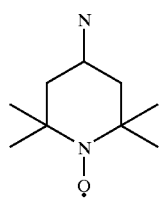

Beilstein Registry Number 6800244
(C$_{11}$H$_{23}$N$_2$O$_2$);

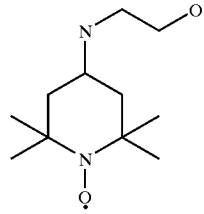

Beilstein Registry Number 5730772
(N-methyl-4-amino-2,2,6,6-tetra-methyl-1-oxylpiperidine;

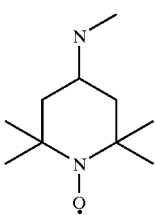

Beilstein Registry Number 5507538
(2,2,6,6-tetramethyl-4-(2-amino-ethylamino)-1-oxylpiperidine);

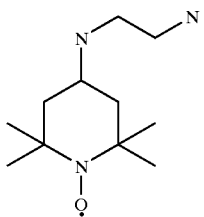

Beilstein Registry Number 4417950
(4<bis (2-hydroxyethyl)>-amino-2,2,6,6-tetramethyl-1-oxylpiperidi-ne);

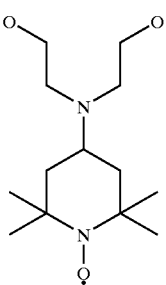

Beilstein Registry Number 4396625
(C$_{12}$H$_{25}$N$_2$O$_2$);

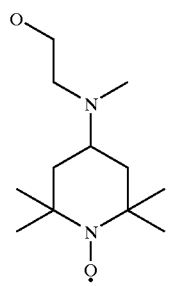

-continued

Beilstein Registry Number 4139900
(4-amino-2,2,6,6-tetramethyl-4-carboxy-1-oxylpiperidine);

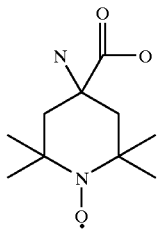

Beilstein Registry Number 4137088
(4-amino-4-cyano-2,2,6,6-tetramethyl-1-oxylpiperidine);

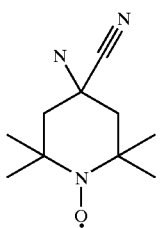

Beilstein Registry Number 3942714
($C_{12}H_{25}N_2O_2$);

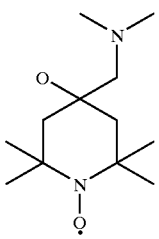

Beilstein Registry Number 1468515
(2,2,6,6-tetramethyl-4-hydroxy-4-acetyl-1-oxylpiperidine);

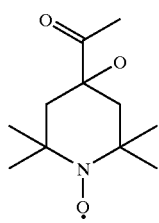

Beilstein Registry Number 1423410
(2,2,4,6,6-pentamethyl-4-hydroxy-1-oxylpiperidine);

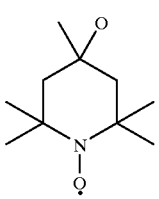

-continued

Beilstein Registry Number 6205316
(4-carboxymethylene-2,2,6,6-tetramethyl-1-oxylpiperidine);

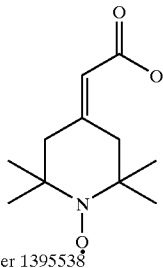

Beilstein Registry Number 1395538
(4-<2-carboxy-benzoyloxy>-2,2,6,6-tetramethyl-1-oxylpiperidine);

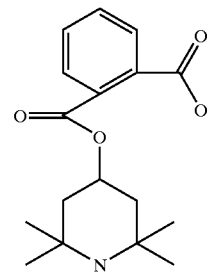

Beilstein Registry Number 3546230
(4-carboxymethyl-2,2,6,6-tetramethyl-1-oxylpiperidine);

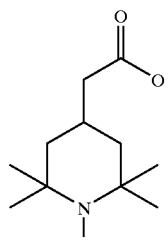

Beilstein Registry Number 3949026
(4-carboxyl-2,2,6,6-tetramethyl-1-oxylpiperidine);

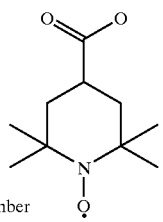

Beilstein Registry Number 4611003
(ethylenediaminetetraacetic acid mono(1-oxyl-2,2,6,6-tetramethylpiperidinyl-4-amide);

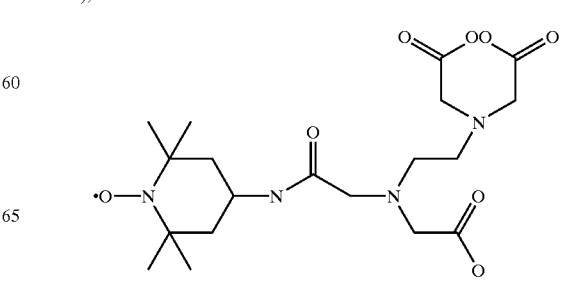

-continued

Beilstein Registry Number 5961636
($C_{13}H_{21}N_2O_4$)

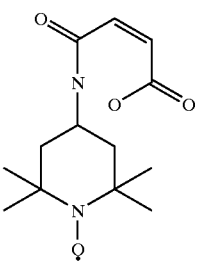

Beilstein Registry Number 5592232
($C_{15}H_{27}N_2O_4$);

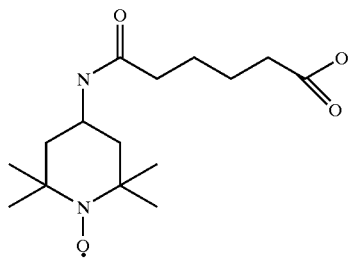

Beilstein Registry Number 5080576
(succinic acid N-(2,2,6,6-tetra-
methyl-1-oxyl-4-piperidinyl)-mono-
amide);

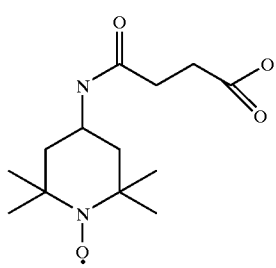

Beilstein Registry Number 5051814
(4-(4-hydroxybutanoylamino)-2,2,6,6-
tetramethyl-1-oxylpiperidine);

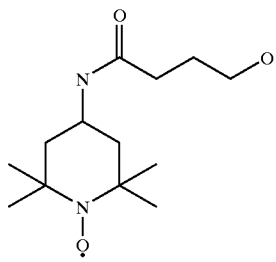

Beilstein Registry Number 4677496
(2,2,6,6-tetramethyl-4-oximino-1-
oxylpiperidine);

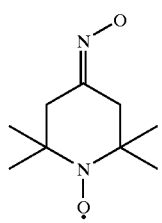

-continued

Beilstein Registry Number 1451068
($C_{11}H_{18}NO_2$);

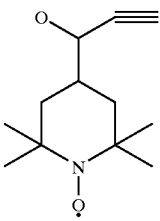

Beilstein Registry Number 1451075
($C_{11}H_{20}NO_2$);

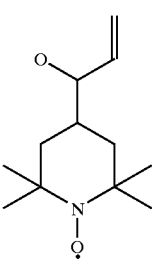

Beilstein Registry Number 1423698
(4-ethyl-4-hydroxy-2,2,6,6-tetra-
methyl-1-oxylpiperidine);

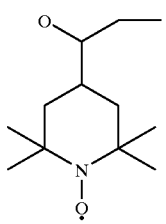

Beilstein Registry Number 5509793
(4-ethoxymethyl-4-hydroxy-2,2,6,6
-tetramethyl-1-oxylpiperidine);

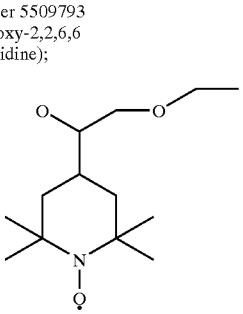

Beilstein Registry Number 3960373
($C_{10}H_{19}N_2O_3$);

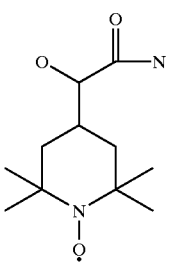

-continued

Beilstein Registry Number 4137089
($C_{10}H_{17}N_2O_2$);

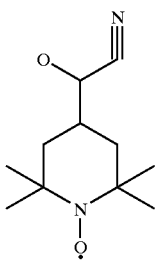

Beilstein Registry Number 3985130
(2,2,6,6-tetramethyl-1-oxyl-4-piperidylidene) succinic acid).

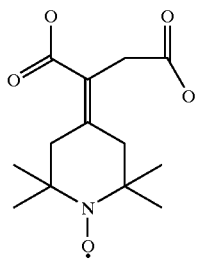

It is of course also possible in accordance with the invention to employ mixtures of stable N-oxyl radicals.

Suitable free-radical polymerization initiators to be employed, in accordance with the invention, in combination with the stable N-oxyl radicals (variant a) according to the invention) are in principle all those capable of initiating a free-radical polymerization. These can be peroxides, hydroperoxides or azo compounds. They may be either oil-soluble or water-soluble.

Examples of suitable free-radical polymerization initiators are benzoyl peroxide, peroxodisulfuric acid and its ammonium and alkali metal salts, and also hydrogen peroxide or hydroperoxides such as tert-butyl hydroperoxide. 4,4'-Azobiscyanovaleric acid is one example of a suitable azo compound. As such water-soluble, free-radical polymerization initiators it is of course also possible to use combined systems composed of at least one reducing agent and at least one peroxide and/or hydroperoxide (referred to below as redox initiators).

Examples of such combinations are tert-butyl hydroperoxide/sodium metal salt of hydroxymethanesulfinic acid, and hydrogen peroxide/ascorbic acid. In many cases the combined systems additionally comprise a small amount of a metal compound which is soluble in the aqueous medium and whose metallic component can exist in two or more valence states. Examples of such systems are ascorbic acid/iron(II) sulfate/hydrogen peroxide or sodium sulfite/iron(II) sulfate/hydrogen peroxide. In the abovementioned systems it is of course also possible for ascorbic acid to be replaced by the sodium metal salt of hydroxymethanesulfinic acid, sodium hydrogen sulfite or sodium metal bisulfite, and/or hydrogen peroxide by tert-butyl hydroperoxide or alkali metal peroxodisulfates and/or ammonium peroxodisulfates. Instead of a water-soluble iron(II) salt use is made in many cases of a combination of water-soluble Fe/V salts.

Based on the molar amount of monomers to be subjected to free-radical polymerization, the amount of free-radical polymerization initiator employed in the novel process is generally from $10^{-6}$ to 2 mol-%, usually from $10^{-4}$ to 1 mol-%, and is guided in a manner known per se by the desired molecular weight of the resulting polymer in disperse distribution.

The molar ratio of stable N-oxyl radicals to free-radical polymerization initiator, in the case of novel process variant a), is normally from 0.5 to 5, preferably from 0.8 to 4.

By adding organic acids, such as camphorsulfonic acid or p-toluenesulfonic acid (U.S. Pat. No. 5,322,912), or by adding dimethyl sulfoxide (U.S. Pat. No. 5,412,047), 2-fluoropyridine 1-metho-p-toluenesulfonate, 4-(3-indolyl) butyric acid or indolylacetic acid to the polymerization mixture it is generally possible to raise the rate of polymerization in the novel process a).

Examples of compounds which under the action of heat dissociate into a stable N-oxyl radical and into a free-radical partner which initiates the polymerization (referred to below as N-oxyl free-radical initiators) and which are therefore suitable for variant b) in accordance with the invention include those of the formula X

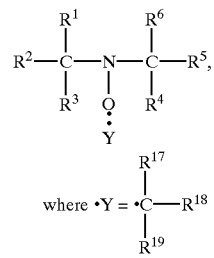

in which $R^{17}$, $R^{18}$ and $R^{19}$ are identical or different and are hydrogen or alkyl($C_1$–$C_4$), phenyl, cyano or carboxyl or substituted groups thereof.

Compounds of the formula X are disclosed, for example, in EP-B 135 280. Compounds of this type are also obtainable simply, for example, by subjecting a small amount of monomers to free-radical polymerization in the presence of compounds I to IX, using a free-radical polymerization initiator, and then purifying the polymerization product by reprecipitation. Based on the molar amount of monomers to be subjected to free-radical polymerization, the amount of N-oxyl free-radical initiators to be used in accordance with the invention is generally from $10^{-6}$ to 2 mol-%, usually from $10^{-4}$ to 1 mol-%.

Suitable monomers to be polymerized in accordance with the invention are all those compounds having at least one ethylenically unsaturated group which are usually employed in the context of free-radical aqueous emulsion polymerizations. They include olefins, for example ethylene, vinylaromatic monomers, such as styrene, α-methylstyrene, o-chlorostyrene or vinyltoluenes, vinyl and vinylidene halides, such as vinyl chloride and vinylidene chloride, esters of vinyl alcohol with $C_1$–$C_{12}$ monocarboxylic acids, such as vinyl acetate, vinyl propionate, vinyl n-butyrate, vinyl laurate and commercially available monomers VEOVA® 9-11 (VEOVA X is a tradename of Shell and stands for vinyl esters of carboxylic acids, which are also known as Versatic® X acids), esters of allyl alcohol with $C_1$–$C_{12}$ monocarboxylic acids, such as allyl acetate, allyl propionate, allyl n-butyrate and allyl laurate, esters of preferably $C_3$–$C_6$ α,β-monoethylenically unsaturated mono- and dicarboxylic acids, especially acrylic, methacrylic, maleic, fumaric and itaconic acid, with in general $C_1$–$C_{12}$-, preferably $C_1$–$C_8$- and, in particular, $C_1$–$C_4$ alkanols, such as in particular methyl, ethyl, n-butyl, isobutyl and 2-ethylhexyl acrylate and methacrylate, dimethyl maleate or maleic acid n-butyl ester, nitriles of α,β-monoethylenically unsaturated carboxylic acids, such as acrylonitrile, and $C_{4-8}$ conjugated dienes, such as 1,3-butadiene and isoprene.

The abovementioned monomers generally constitute the principal monomers which, based on the total amount of monomers to be incorporated by polymerization, normally account for a proportion of more than 50% by weight. Monomers which when polymerized alone usually give homopolymers of increased solubility in water are normally copolymerized only as modifying monomers in amounts, based on the total amount of monomers to be polymerized, of less than 50% by weight, generally from 0.5 to 20% by weight and preferably from 1 to 10% by weight.

Examples of such monomers are $C_3$–$C_6$ α,β-monoethylenically unsaturated mono- and dicarboxylic acids and their amides, examples being acrylic, methacrylic, maleic, fumaric and itaconic acid, acrylamide and methacrylamide, and also vinylsulfonic acid and its water-soluble salts, and N-vinylpyrrolidone.

Monomers which usually enhance the internal strength of the films of the aqueous polymer dispersions are generally copolymerized likewise only in minor amounts, usually from 0.5 to 10% by weight, based on the total amount of monomers to be polymerized. Such monomers normally have an epoxy, hydroxyl, N-methylol or carbonyl group or at least two nonconjugated ethylenically unsaturated double bonds. Examples thereof are N-alkylolamides of $C_3$–$C_{10}$ α,β-monoethylenically unsaturated carboxylic acids and their esters with $C_1$–$C_4$-alkanols, among which N-methylolacrylamide and N-methylolmethacrylamide are very especially preferred, monomers having two vinyls, monomers having two vinylidenes, and monomers having two alkenyls. Particularly suitable in this context are the diesters of dihydric alcohols with α,β-monoethylenically unsaturated monocarboxylic acids, among which in turn it is preferred to employ acrylic and methacrylic acid. Examples of such monomers having two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylate and also propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Also of particular importance in this context are the $C_1$–$C_8$-hydroxyalkyl esters of acrylic and methacrylic acid, such as n-hydroxyethyl, n-hydroxypropyl or n-hydroxybutyl acrylate and methacrylate, and also compounds such as diacetoneacrylamide and acetylacetoxyethyl acrylate and methacrylate.

The novel process can be applied with preference to the monomers styrene, vinyltoluene, $C_1$–$C_8$-alkyl (meth)acrylates, especially n-butyl acrylate, 2-ethylhexyl acrylate or methyl methacrylate, and acrylonitrile and also to monomer mixtures composed to at least 85% by weight of the abovementioned monomers or mixtures of the abovementioned monomers.

Dispersants which are suitable in accordance with the invention are, in particular, the emulsifiers which are commonly employed in the context of free-radically initiated aqueous emulsion polymerizations. Examples of these are block copolymers of ethylene oxide and propylene oxide, ethoxylated mono-, di- and trialkylphenols (for example EO units: 3 to 50 and alkyl: $C_4$–$C_9$), ethoxylated fatty alcohols (for example EO units: 3 to 50 and alkyl: $C_8$–$C_{36}$), and also alkali metal salts and ammonium salts of alkyl sulfates (for example alkyl: $C_8$–$C_{30}$), of sulfuric monoesters of ethoxylated alkanols (for example EO units: 4 to 30 and alkyl: $C_{12}$–$C_{30}$) and of ethoxylated alkylphenols (for example EO units: 3 to 50 and alkyl: $C_4$–$C_{15}$), of alkylsulfonic acids (for example alkyl: $C_{12}$–$C_{35}$) and of alkylarylsulfonic acids (for example alkyl: $C_9$–$C_{35}$). Also included in the group of emulsifiers suitable in accordance with the invention are the sulfosuccinates (sulfosuccinic esters) of $C_8$–$C_{18}$-alkanols, and also the water-soluble salts of these sulfosuccinates, especially the alkali metal salts, among which the sodium salt is preferred.

Further suitable dispersants are compounds of the formula XI

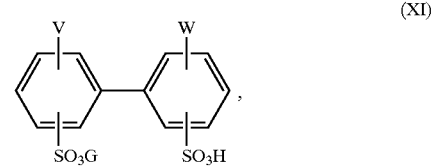

(XI)

where V and W are hydrogen or $C_4$–$C_{14}$-alkyl but are not hydrogen at the same time, and G and H can be alkali metal ions and/or ammonium ions. Preferably, V and W are linear or branched alkyls of 6 to 18 carbons or hydrogen, and especially of 6, 12 and 16 carbons, and are not both simultaneously hydrogen. G and H are preferably sodium, potassium or ammonium ions, particular preference being given to sodium. Particularly advantageous compounds XI are those in which G and H are sodium, V is branched alkyl of 12 carbons and W is hydrogen or V. Use is frequently made of technical-grade mixtures with a proportion of from 50 to 90% by weight of the monoalkylated product, for example Dowfax® 2A1 (trademark of Dow Chemical Company). The compounds XI are generally known, for example from U.S. Pat. No. 4,269,749, and are obtainable commercially. The amount of emulsifier is judiciously chosen, in accordance with the invention, such that the critical micelle concentration of the emulsifiers used is essentially not exceeded in the aqueous phase of the aqueous emulsion to be polymerized. Based on the monomers present in the emulsion, the amount of emulsifier is generally from 0.1 to 5% by weight. It is of course possible for the emulsifiers to be accompanied by protective colloids, which have the capacity to stabilize the disperse distribution of the aqueous polymer dispersion which ultimately results.

To prepare the aqueous emulsion required in accordance with the invention, whose disperse phase consists predominantly of droplets with a dimater of ≦500 nm, it is judicious first of all to produce a conventional aqueous emulsion, a macroemulsion, from the constituents of the emulsion in a manner known per se (for example to mix the monomers, the stable N-oxyl radical, the free-radical polymerization initiator, water and the emulsifier with one another with conventional stirring; or to mix the monomers, a N-oxyl free-radical initiator, water and the emulsifier with one another with conventional stirring; as a result of the low dispersion effort, the resulting aqueous emulsion consists predominantly of droplets with a diameter ≧1000 nm).

This emulsion can subsequently be homogenized to give the aqueous emulsion required in accordance with the invention (cf. P. L. Tang, E. D. Sudol, C. A. Silebi and M. S. El-Aasser in Journal of Applied Polymer Science, Vol. 43, pp. 1059–1066 [1991]). In general this is done using high-pressure homogenizers. In these machines the fine distribution of the components is obtained by a high local energy input. In this context, two variants have proven particularly suitable.

In the first variant, the aqueous macroemulsion is compressed to more than 1000 bar using a piston pump and is then released through a narrow gap. The action here is based on an interplay of high shear and pressure gradients and cavitation in the gap. One example of a high-pressure homogenizer which functions in accordance with this principle is the Niro-Soavi high-pressure homogenizer model NS1001L Panda.

In the second variant, the compressed aqueous macroemulsion is released into a mixing chamber by way of two mutually opposed nozzles. In this case the action of fine distribution depends above all on the hydrodynamic conditions within the mixing chamber. One example of this type of homogenizer is the model M 120 E from Microfluidics Corp. In this high-pressure homogenizer, the aqueous macroemulsion is compressed by means of a pneumatic piston pump to pressures of up to 1200 atm and is released through an "interaction chamber". In the interaction chamber the emulsion jet is divided in a microchannel system into two jets which are caused to collide at 180°. Another example of a homogenizer operating in accordance with this mode of homogenization is the Nanojet model Expo from Nanojet Engineering GmbH. However, with the Nanojet, instead of a fixed channel system, two homogenizing valves are installed which can be adjusted mechanically.

In addition to the principles just mentioned homogenization can also be brought about, for example, by the use of ultrasound (for example Branson Sonifier II 450). In this case the fine distribution is the result of cavitation mechanisms. The degree of division of the aqueous emulsion produced in the sonic field is dependent not only on the sonic power input but also on other factors, such as the intensity distribution of the ultrasound in the mixing chamber, the residence time, the temperature and the physical properties of the substances to be emulsified, for example the viscosity, surface tension and vapor pressure. The resulting droplet size depends in this case, inter alia, on the concentration of the emulsifier and on the energy input for homogenization, and can be adjusted specifically by, for example, making a corresponding change in the homogenization pressure and/or in the corresponding ultrasound energy.

The mean size of the droplets of the disperse phase of the aqueous emulsion to be used in accordance with the invention can be determined in accordance with the principle of quasielastic dynamic light scattering (the z-mean droplet diameter $\bar{d}_z$ of the unimodal analysis of the autocorrelation function; see examples).

In accordance with the invention, the values thus determined for $\bar{d}_z$ in the case of aqueous emulsions to be used in accordance with the invention are normally $\leq 500$ nm, frequently $\leq 400$ nm. A favorable $\bar{d}_z$ range in accordance with the invention is that from 100 nm to 300 nm, or from 100 nm to 200 nm. Normally, $\bar{d}_z$ of the aqueous emulsion to be employed in accordance with the invention is $\geq 40$ nm.

It is favorable for the stability of the droplet size distribution of the aqueous emulsion to be employed in accordance with the invention if the organic phase includes at least one compound whose solubility in water based on the saturated aqueous solution at 25° C. and 1 atm is essentially less than 0.001% by weight (this ensures reduced Ostwald ripening). This compound of which there is at least one can be a monomer, an N-oxyl radical or an N-oxyl free-radical initiator. If none of the constituents mentioned of the mixture to be polymerized has the low water-solubility required above, it is advisable to incorporate into the organic droplets of the aqueous emulsion that is to be used in accordance with the invention a nonfree-radically polymerizable organic compound of appropriately low solubility in water.

Examples of monomers which do have the low water-solubility required above are p-tert-butylstyrene, esters of $C_3$–$C_6$ α,β-monoethylenically unsaturated carboxylic acids and alkanols having $\geq 12$ carbons (generally up to 30 carbons), for example lauryl acrylate and stearyl acrylate, or else esters of vinyl alcohol or allyl alcohol and alkanecarboxylic acids having $\geq 9$ carbons (generally up to 30 carbons), examples being vinyl nonanoate (VEOVA 9), vinyl decanoate (VEOVA 10), vinyl laurate and vinyl stearate. Other such monomers are macromonomers such as oligopropene acrylate (in very general terms, macromonomers are polymeric or oligomeric compounds having at least one, usually terminal, ethylenically unsaturated double bond; their relative number-average molecular weight should, in order to make them suitable for use as a monomer of very low solubility in water, preferably not amount to more than 100,000; in general, this relative number-average molecular weight will be from 1000 to 50,000 or from 2000 to 50,000; macromonomers are known to the skilled worker; their preparation is described, for example, in Makromol. Chem. 223 (1994) pp. 29 to 46). Very generally, monomers of very low solubility in water are all those whose molal solubility at 25° C. and 1 atm in water is less than the corresponding solubility of lauryl acrylate. Further examples of such monomers are the methacryloyl-polybutyl acrylate AB-6 and the methacryloyl-polystyrene A5-6 from Toa Gosei Kagaku K K (JP), both of which have a number-average relative molecular weight of 6000. Polyol 130 from Hüls AG (a stereospecific polybutadiene of low viscosity (75% 1,4-cis, 24% 1,4-trans, 1% vinyl) whose dynamic viscosity at 20° C. is 3000 mPa·s) and Polyol 110 from Hüls AG (a stereospecific polybutadiene of low viscosity (75% 1,4-cis, 24% 1,4-trans, 1% vinyl), whose dynamic viscosity at 20° C. is 3000 mPa·s), however, also constitute compounds which can be employed as macromonomers of low solubility in water.

Examples of nonpolymerizable compounds which can be used in accordance with the invention and have low solubility in water are Acronal® A 150 F, a poly-n-butyl acrylate from BASF AG whose 50% strength by weight solution in ethyl acetate at 23° C. and 1 atm has a viscosity (determined in accordance with ISO 3219, DIN 53019, at 250 $s^{-1}$) of 33 mpa·s.

A further possibility as a compound suitable for lessening Ostwald ripening is PnBa, a high-temperature (120° C.) solution (isopropanol) polymer of n-butyl acrylate having a K value, determined at 25° C. in isopropanol, of 24. The K value is a relative viscosity number which is determined in analogy to DIN 53726. It constitutes the flow rate of the pure solvent relative to that of the 0.1% strength solution of the polymer in the same solvent (cf. also Cellulosechemie, Vol. 13 (1932), pp. 58–64, and Kirk-Othmer Encyclopedia of Chemical Technology, Vol. 23, pp. 967–968). The K value is a measure of the mean molecular weight of a polymer, where a high K value corresponds to a high mean molecular weight.

Other possible compounds which reduce Ostwald ripening are resins, such as colophony resins (rosins) (cf. Ullmanns Encycl. Techn. Chem., 4th Edition (1976), Vol. 12, pp. 525–538) and hydrocarbon resins (cf. Encycl. Polym. Sci. Eng. (1987) Vol. 7, pp. 758–782), for example Kristalex F 85 from Hercules. A typical example is Foral® 85 E, a glycerol ester of highly hydrogenated rosin (softening point: 86° C.) from Hercules. Other suitable compounds are polystyrenes (cf. C. M. Miller et al., J. Polym. Sci.: Part A: Polym. Chem. 32, 2365–2376, 1994).

Yet further suitable possible compounds which lessen Ostwald ripening (and which are frequently employed in the form of mixtures) are water-insoluble, oil-soluble substances, such as aliphatic and aromatic hydrocarbons (for example hexadecane), film-forming auxiliaries, or plasticizers such as Plastilit® 3060 (a polypropylene glycol alkylphenyl ether plasticizer).

The aqueous emulsions to be used in accordance with the invention preferably include, based on the monomers present, at least 0.5% by weight of a comound of very low solubility in water as described above.

There is no upper limit on the amount, obtained on this basis, of compounds present which have a very slight solubility in water. This statement is valid in particular if the compounds used are exclusively monomers. Where the compound which is used and which has a very slight solubility in water is not a monomer and not an N-oxyl free-radical initiator, its content on the basis described above will, however, not normally exceed 200% by weight and will frequently be ≦100% by weight. Other novel embodiments are those in which the content—on the above basis—of these compounds is from 1 to 50% by weight or from 2 to 30% by weight or from 5 to 15% by weight.

The aqueous emulsions as described above are most simply polymerized by heating them to the polymerization temperature in a polymerization vessel. Said temperature is advantageously, in accordance with the invention, >100° C. to 180° C., in particular from 120 to 150° C.

Polymerization is preferably conducted at a pressure which is above the vapor pressure of the polymerization mixture at the appropriate polymerization temperature. This pressure can be >1 bar to 1000 bar, advantageously from 2 to 20 bar and, with very special advantage, from 4 to 10 or from 5 to 7 bar.

The desired pressure conditions can be established in a simple manner by establishing an initial pressure in the polymerization reactor, before the polymerization mixture is heated to the desired polymerization temperature, by means of inert gases such as, for example, methane, $CO_2$, CO, Ar, He or $N_2$. Such an initial pressure may typically be from 3 to 5 bar, for example. The closed polymerization reactor (pressure reactor) is then brought to the polymerization temperature. The novel free-radically initiated aqueous emulsion polymerization is normally conducted in the absence of molecular oxygen.

It is of course also possible, however, to carry out the polymerization in the presence of molecular oxygen. In other words, the desired initial pressure can also be established by means of air, for example, or else using gaseous monomers such as butadiene or ethylene, alone or in a mixture with the abovementioned gases. The initial pressure is usually established at temperatures <100° C., generally at from 0° C. to 75° C. or from 25° C. to 75° C.

In the case of the novel process variant a) the temperature of the novel aqueous emulsion to be polymerized is frequently first of all established at a value of 50° C. to ≦100° C. in order to initiate the dissociation of the free-radical polymerization initiator. Heating to the actual polymerization temperature is then carried out.

It is essential to the invention that the product obtained is a pseudo-living aqueous polymer dispersion. In other words, if new monomers are added to the resulting aqueous polymer dispersion (simply by stirring in) and the temperature is then raised, the polymerization is continued without the need to add free-radical polymerization initiator. In this case the dispersed particles of the aqueous polymer dispersion obtained beforehand function as polymerization sites.

In this way it is possible in a comparatively controlled form to produce random, alternating or segmented copolymers, especially diblock and triblock copolymers. All that is required is to change the supplied type of monomer with the appropriate frequency.

By appropriate control of the supply of monomers to be polymerized it is also possible to prepare gradient polymers, ie. polymers with a decreasing or increasing content of comonomer along the polymer chain. In the case of triblock copolymers A-block-B-block-C-block, the blocks A and C can be composed of identical or different monomers. The glass transition temperature of the blocks can be chosen as desired. For example, the chemical composition of blocks A and C can be chosen such that their glass transition temperature is ≧0° C. At the same time, the chemical composition of block B can be chosen such that its glass transition temperature is <0° C.

In this context more than 70% by weight, for example, of the block B can be composed of $C_1$–$C_8$ (meth)acrylates in polymerized form. In this context the block B is frequently composed of n-butyl acrylate, 2-ethylhexyl acrylate or mixtures thereof in polymerized form.

Comonomers which can be incorporated by polymerization can also of course be those having more than one vinyl group. The result of this is crosslinked polymers. It is particularly advantageous in accordance with the invention to prepare aqueous polymer dispersions whose dispersed polymer particles have a core/shell morphology. The advantageousness of this results, in particular, from an enhanced attachment of the shell to the core. A core/shell morphology is generally obtainable when, with the period of polymerization, a change in monomer is made and at the same time the new formation of dispersed polymer particles is essentially suppressed. Preferably, monomers with a crosslinking action are copolymerized into the core. The core can be composed, for example, of polystyrene or polymethyl methacrylate or of a copolymer of styrene and acrylonitrile and can have a glass transition temperature ≧25° C. The first shell can consist, for example, of polybutadiene, poly-n-alkyl acrylate, such as poly-n-butyl acrylate, or copolymers with a glass transition temperature Tg <0° C. This can be followed by one or more additional hard shells (for example composed of polystyrene, polymethyl methacrylate or poly-styrene-acrylonitrile copolymer) having a Tg ≧25° C.

Following their isolation, such core/shell polymer particles can be used to modify other plastics.

The molecular weight of the polymers obtainable in accordance with the invention and present in dispersion in the aqueous medium can be established in a simple manner by reducing the polymerization temperature at the desired point in time and so freezing the blockage of the growing polymer chain ends by the stable N-oxyl radicals. In general this takes place at below 100° C. Such a blockage can be reversed by raising the temperature. An alternative for establishing the molecular weight is to limit the amount of monomers to be polymerized. An irreversible establishment of the molecular weight is provided by the addition of conventional molecular weight regulators, such as esters of thioglycolic acid and 2-ethylhexanol or tert-dodecyl mercaptan. Adding them terminates the growing polymer chain ends irreversibly and frees the polymer chains from the stable N-oxyl radicals, which can be eliminated subsequently, for example, by appropriate extraction.

In accordance with the invention it is therefore possible to obtain, in a simple manner, aqueous dispersions of polymers whose weight-average molecular weight $\overline{M}_w$ has specific values of from ≧1000 to 250,000, or ≧10,000 to 250,000. The polydispersity indices of the molecular weight can be <2, frequently ≦1.5. In the case of block copolymers, this applies to the individual segments as well.

After the end of the polymerization the particle size of the dispersed polymer particles can be increased, for example, by chemical agglomeration or by pressure agglomeration. The aqueous polymer dispersion can subsequently be concentrated by evaporating the dispersion medium. In this way it is possible to prepare aqueous polymer dispersions, in accordance with the invention, whose solids content is from 10 to 50% by volume and, if required, up to 75% by volume based on the aqueous polymer dispersion.

In accordance with the invention it is possible to obtain aqueous polymer dispersions whose dispersed polymer particles consist of polymer with the following structure:

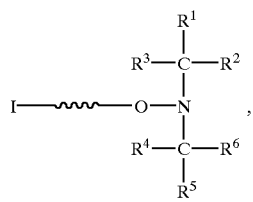

where
I=residue of the free-radical polymerization initiator and
∿∿∿∿∿=branched or linear copolymer.

If a free-radical polymerization initiator is used which on thermal dissociation produces fragments having more than one free-radical functionality, the following structures are also possible:

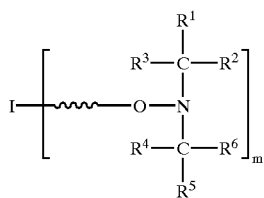

where m=1 to 4.

Similar structures are possible if polyfunctional stable N-oxyl radicals are used, in other words compounds having more than one N-oxyl radical group.

Where ∿∿∿∿∿ is a block copolymer comprising a hydrophobic and a hydrophilic block, the abovementioned structures are suitable as dispersants (cf. Prior Application DE-A 19648029).

A disadvantage of the free-radically initiated aqueous emulsion polymerization according to the invention is its in some cases comparatively low reaction rate. With this in mind it may be judicious to combine the novel procedure with a conventional free-radically initiated aqueous emulsion polymerization. This can be done, for example, by beginning in accordance with the invention and then proceeding in conventional fashion.

In this case, for example, free-radical polymerization initiator is added in excess (based on the amount of N-oxyl radical present) at the point in time which is considered appropriate. In general in this case, the addition of initiator will be accompanied by the addition of monomer and, if desired, of emulsifier.

The polydispersity of the resulting polymer is then higher. The novel process can of course be implemented in the feed-stream procedure in accordance with DE-A 19 628 143.

EXAMPLES

General Remarks

The mean size of the droplets of the disperse phase of the aqueous emulsions to be used in accordance with the invention, and the mean size of the polymer particles present in disperse distribution in the resulting aqueous polymer dispersion, were determined using the principle of quasielastic dynamic light scattering (the parameter determined was the z-mean diameter $\bar{d}_z$ of the unimodal analysis of the autocorrelation function). This was done using a Coulter N4 Plus Particle Analyser from Coulter Scientific Instruments (1 bar, 25° C.). The measurements were carried out on dilute aqueous emulsions or dispersions whose content of nonaqueous constituents was 0.01% by weight. Dilution was carried out, in the case of the aqueous polymer dispersions, with water and, in the case of the aqueous emulsions, with water saturated in the nonaqueous phase. The latter measure was intended to prevent dilution from being accompanied by any change in the droplet diameter.

The solids contents of the resulting aqueous polymer dispersions were determined by gravimetry in accordance with DIN 53 216 (drying period: 30 minutes, drying temperature: 140° C.).

The molecular weights were determined by GPC (gel permeation chromatography). Calibration took place using polystyrene standards; tetrahydrofuran was chosen as the mobile phase, and detection took place on the basis of the refractive index.

To demonstrate a block structure, ultrathin sections of the film of the aqueous polymer dispersion were taken using an Ultracut E (from Reichert Jung) at room temperature. The sections were transferred to Cu gauzes and contrasted in $OsO_4$ vapor (butadiene reacts with $OsO_4$). Then transmission electron micrographs (TEM) of the contrasted section were taken (the heavy osmium nuclei intercept the electrons, while the other atomic nuclei transmit them).

The glass transition temperature Tg was determined according to the differential scanning calorimetry method (DSC, midpoint temperature) on the films of the aqueous polymer dispersions.

Before beginning the polymerization, the polymerization vessels were charged at 25° C.

Preparing N-oxyl free-radical initiators

A) 4.5 g of benzoyl peroxide hydrate (25% by weight water), 0.938 g of 2,2,6,6-tetramethyl-1-oxylpiperidine (TEMPO) and 1.5 g of camphorsulfonic acid (CSA) were stirred into 750 g of styrene at 25° C. The mixture was then heated to 135° C. and held at this temperature for 4.5 h. The reaction mixture was subsequently cooled and was dried at 30° C. under reduced pressure. The residue was taken up in toluene and reprecipitated twice from methanol (based on toluene, ten times the amount by mass of methanol were used). This gave 545 g of a macromolecular N-oxyl free-radical initiator A. Table 1 shows its $\overline{M}_w$, $\overline{M}_n$ and PDI.

B) 1.29 g of benzoyl peroxide hydrate (25% by weight water), 0.938 g of TEMPO and 0.32 g of CSA were stirred into 208.3 g of styrene at 25° C. The mixture was then heated to 125° C. and held at this temperature for 6 h. Then the reaction mixture was cooled and dissolved in toluene at 25° C. The product was then reprecipitated twice from methanol (based on toluene, ten times the amount by mass of methanol were used). This gave 63 g of a macromolecular N-oxyl free-radical initiator B. Table 1 shows its $\overline{M}_w$, $\overline{M}_n$ and PDI.

TABLE 1

| N-Oxyl free-radical initiator | $\overline{M}_n$ | $\overline{M}_w$ | PDI |
|---|---|---|---|
| A | 18744 | 30553 | 1.63 |
| B | 18507 | 23690 | 1.28 |

Comparative Example 19.5 g of the N-oxyl free-radical initiator B were mixed with 84.75 g of styrene, 2.54 g of an 80% strength by weight aqueous solution of the sodium salt of the dihexyl ester of sulfosuccinic acid (Aerosol® MA80 from Dow Chemical Inc., emulsifier solution 1) and 716.1 g of water, with stirring. The resulting aqueous emulsion was then introduced into a stirred 3 l pressure vessel. An initial pressure of 5 bar was produced in this vessel by means of molecular nitrogen, and the aqueous emulsion ($\overline{d}_z$>>500 nm) was heated to 130° C. and held at this temperature for 3 h. Then 57.59 g of acrylonitrile, 29.35 g of styrene and 2.17 g of emulsifier solution were introduced into the pressure vessel, and the mixture was stirred at 130° C. for a further 4 h under the corresponding superatmospheric pressure. The reaction mixture was then cooled to 25° C. and analyzed. Essentially no polymer formation was found.

Example 1

19.5 g of the N-oxyl free-radical initiator B were mixed with 84.75 g of styrene, 2.54 g of emulsifier solution 1 and 716.8 g of water, with stirring. The resulting mixture was then homogenized using ultrasound (Branson Sonifier II 450) for 20 minutes to give an aqueous emulsion with $\overline{d}_z$=169 nm. The resulting aqueous emulsion was then introduced into a stirred 3 l pressure vessel. An initial pressure of 5 bar was established in this vessel by means of molecular nitrogen, and then the aqueous emulsion was heated to 130° C. and held at this temperature for 3 h. A sample was subsequently taken and analyzed. The system present was a stable aqueous polymer dispersion which is characterized in Table 2. Finally, as in the comparative example, 57.59 g of acrylonitrile, 29.35 g of styrene and 2.17 g of emulsifier solution 1 were introduced into the pressure vessel, and the mixture was stirred at 130° C. for a further 4 h under the corresponding superatmospheric pressure. The reaction mixture was then cooled to 25° C. A stable aqueous polymer dispersion was obtained which is characterized in Table 2.

TABLE 2

| Polymerization period (h) | Solids content (% by wt.) | $\overline{d}_z$ (nm) | Glass transition temp. [° C.] | $\overline{M}_w$ | PDI |
|---|---|---|---|---|---|
| 3 | 5.4 | 192 | 93.8 | 62800 | 1.55 |
| 7 | 12 | 214 | 87.4 | 187500 | 1.97 |

Example 2

0.12 g of TEMPO, 0.09 g of benzoyl peroxide hydrate (25% by weight water), 96.51 g of styrene, 4.83 g of hexadecane, 2.54 g of emulsifier solution 1 and 716 g of water were mixed with stirring. The resulting mixture was then homogenized using ultrasound (Branson Sonifier II 450) to give an aqueous emulsion with $\overline{d}_z$=188 nm. The resulting aqueous emulsion was then introduced into a stirred 3 l pressure vessel. An initial pressure of 5 bar was established in this vessel by means of molecular nitrogen, and then the aqueous emulsion was heated to 130° C. and held at this temperature for 3 h. Subsequently, 57.59 g of acrylonitrile, 29.35 g of styrene and 2.17 g of emulsifier solution 1 were introduced into the pressure vessel, and the mixture was stirred at 130° C. for a further 4 h under the corresponding superatmospheric pressure. The reaction mixture was then cooled to 25° C. A stable aqueous polymer dispersion was obtained which is characterized in Table 3. In addition, Table 3 shows the result of the analysis of various samples taken as a function of the polymerization period.

TABLE 3

| Polymerization period (h) | Solids content (% by wt.) | $\overline{d}_z$ (nm) | $M_w$ | PDI |
|---|---|---|---|---|
| 1 | 0.7 | 272 | — | — |
| 2 | 2.6 | 287 | — | — |
| 3 | 3.5 | 297 | — | — |
| 4 | 7.3 | 387 | 40830 | 1.35 |
| 5 | 8.7 | 414 | 87270 | 1.53 |
| 6 | 11.4 | 457 | 112300 | 1.64 |
| 7 | 11.5 | 484 | 138800 | 1.75 |

Example 3

33 g of the N-oxyl free-radical initiator A were mixed with 165 g of styrene, 7.07 g of a 35% strength by weight aqueous solution of the sodium salt of the sulfuric monoester of ethoxylated nonylphenol [EO units: 25] (Emulphor® NPS from BASF Aktiengesellschaft, emulsifier solution 2), 1.65 g of a 50% strength by weight aqueous solution of the sodium salt of the dioctyl ester of sulfosuccinic acid (Lumiten® I-RA from BASF Aktiengesellschaft, emulsifier solution 3) and 800 g of water, with stirring. The resulting mixture was then homogenized using ultrasound (Branson Sonifier II 450) to give an aqueous emulsion with $\overline{d}_z$=185 nm. The resulting aqueous emulsion was then introduced into a stirred 3 l pressure vessel. An initial pressure of 1 bar was established in this vessel by means of molecular nitrogen, and then the aqueous emulsion was heated to 130° C. and held at this temperature for 24 h. The reaction mixture was then cooled to 25° C. A stable aqueous polymer dispersion was obtained which is characterized in Table 4. In addition, Table 4 shows the result of the analysis of various samples taken as a function of the polymerization period.

TABLE 4

| Polymerization period (h) | Solids content (% by weight) | $\overline{d}_z$ (nm) | $\overline{M}_w$ | PDI |
|---|---|---|---|---|
| 1 | 3.3 | 189 | 32466 | 1.58 |
| 2 | 3.5 | 189 | — | — |
| 3 | 4.3 | 190 | — | — |
| 4 | 6.1 | 197 | — | — |
| 5 | 7.4 | 205 | 65573 | 1.65 |
| 6 | 8.7 | 206 | 76728 | 1.72 |
| 7 | 10.2 | 220 | — | — |
| 7,5 | 10.6 | 220 | 92649 | 1.80 |
| 24 | 13.1 | 225 | 153180 | 2.09 |

Comparison Example

As Example 3, but replacing the N-oxyl free-radical initiator A by 33 g of polystyrene prepared by conventional anionic polymerization in cyclohexane using n-butyllithium ($\overline{M}_w$=45350, $\overline{M}_w/\overline{M}_n$=1.15). After only 2 h of polymerization the PDI was 2.53 with $\overline{M}_w$=111930. After 7 h of polymerization the PDI was 4.11.

Example 4

16.4 g of the N-oxyl free-radical initiator A were mixed with 41 g of styrene, 41 g of butyl acrylate, 2.05 g of emulsifier solution 1 and 400 g of water, with stirring. The mixture was then homogenized using ultrasound (Branson Sonifier II 450) to give an aqueous emulsion with $\overline{d}_z$=205 nm. The resulting aqueous emulsion was then introduced into a stirred 3 l pressure vessel and diluted therein with 485 g of water. An initial pressure of 1 bar was established in this vessel by means of molecular nitrogen, and then the aqueous emulsion was heated to 130° C. and held at this temperature for 25 h. The reaction mixture was then cooled to 25° C. A stable aqueous polymer dispersion was obtained which is characterized in Table 5. In addition, Table 5 shows the result of the analysis of various samples taken as a function of the polymerization period.

TABLE 5

| Polymerization period [h] | Solids content (% by wt.) | $\overline{d}_z$ (nm) | $\overline{M}_w$ | PDI |
| --- | --- | --- | --- | --- |
| 3 | 2.6 | — | 46050 | 1.64 |
| 18 | 6.6 | — | 141800 | 2.66 |
| 25 | 7.1 | 213 | 153900 | 2.79 |

Example 5

16.4 g of the N-oxyl free-radical initiator A were mixed with 82 g of vinyltoluene, 2.05 g of emulsifier solution 1 and 400 g of water, with stirring. The mixture was then homogenized using ultrasound (Branson Sonifier II 450) to give an aqueous emulsion with $\overline{d}_z$=194 nm. The resulting aqueous emulsion was then introduced into a stirred 3 l pressure vessel and diluted therein with 485 g of water. An initial pressure of 2 bar was established in this vessel by means of molecular nitrogen, and then the aqueous emulsion was heated to 124° C. and held at this temperature for 42 h. The reaction mixture was then cooled to 25° C. A stable aqueous polymer dispersion was obtained which is characterized in Table 6. In addition, Table 6 shows the result of the analysis of various samples taken as a function of the polymerization period.

TABLE 6

| Polymerization period [h] | Solids content (% by wt.) | $\overline{d}_z$ (nm) | $\overline{M}_w$ | PDI |
| --- | --- | --- | --- | --- |
| 1 | 2.3 | — | — | — |
| 18 | 5.6 | — | — | — |
| 22 | 6.9 | — | — | — |
| 25 | 7.2 | — | — | — |
| 42 | 8.5 | 269 | 140000 | 2.24 |

Example 6

16.4 g of the N-oxyl free-radical initiator B were mixed with 24.6 g of styrene, 55.76 g of n-butyl acrylate, 1.64 g of dicyclopentadienyl acrylate, 2.05 g of emulsifier solution 1 and 400 g of water, with stirring. The mixture was then homogenized using ultrasound (Branson Sonifier II 450) to give an aqueous emulsion with $\overline{d}_z$=171 nm. The resulting aqueous emulsion was then introduced into a stirred 3 l pressure vessel and diluted therein with 485 g of water. An initial pressure of 2 bar was established in this vessel by means of molecular nitrogen, and then the aqueous emulsion was heated to 130° C. and held at this temperature for 24 h. The reaction mixture was then cooled to 25° C. A stable aqueous polymer dispersion was obtained which is characterized in Table 7. In addition, Table 7 shows the result of the analysis of various samples taken as a function of the polymerization period.

TABLE 7

| Polymerization period [h] | Solids content (% by wt.) | $\overline{d}_z$ (nm) | Glass transition temperature [° C.] | $\overline{M}_w$ | PDI |
| --- | --- | --- | --- | --- | --- |
| 3 | 3.8 | | 9.85 | 129500 | 2.37 |
| 16 | 4.6 | | — | 141100 | 2.79 |
| 24 | 5.1 | 212 | — | Measurement impossible due to excessive crosslinking | |

Example 7

16.4 g of the N-oxyl free-radical initiator A were mixed with 82 g of styrene, 2.05 g of emulsifier solution 1 and 400 g of water, with stirring. The mixture was then homogenized using ultrasound (Branson Sonifier II 450) to give an aqueous emulsion with $\overline{d}_z$=211 nm. The resulting aqueous emulsion was then introduced into a stirred 3 l pressure vessel and diluted therein with 485 g of water. An initial pressure of 1 bar was established in this vessel by means of molecular nitrogen, and then the aqueous emulsion was heated to 130° C. and held at this temperature for 6 h. Following this, 38 g of butadiene were introduced into the pressure vessel and the polymerization was continued for a further 21 h at 130° C. and at the corresponding superatmospheric pressure. The reaction mixture was then cooled to 25° C. A stable aqueous polymer dispersion was obtained which is characterized in Table 8. In addition, Table 8 shows the result of the analysis of a sample taken after 6 h. TEM micrographs of film sections of the resulting aqueous polymer dispersion contrasted with OsO$_4$ show the expected formation of block copolymers within the dispersed polymer particles.

TABLE 8

| Polymerization period [h] | Solids content (% by wt.) | $\overline{d}_z$ (nm) | Glass transition temperature [° C.] | $\overline{M}_w$ | PDI |
| --- | --- | --- | --- | --- | --- |
| 6 | 5.4 | 240 | 97.8 | 92101 | 1.76 |
| 27 | 7.0 | 260 | 8.6//84.4 | 259840 | 3.86 |

Example 8

11.3 g of the N-oxyl free-radical initiator B were mixed with 56.50 g of styrene, 1.51 g of emulsifier solution 1 and 275.4 g of water, with stirring. The mixture was then homogenized using ultrasound (Branson Sonifier II 450) to give an aqueous emulsion with $\overline{d}_z$=229 nm. The resulting aqueous emulsion was then introduced into a stirred 3 l pressure vessel and an initial pressure of 2 bar was established in this vessel by means of molecular nitrogen. Then the aqueous emulsion was heated to 130° C. and held at this temperature for 4 h. Following this, 38 g of butadiene were introduced into the pressure vessel and the polymerization was continued for a further 20 h at 130° C. and at the corresponding superatmospheric pressure. The reaction mixture was then cooled to 25° C. A stable aqueous polymer dispersion was obtained which is characterized in Table 9. In addition, Table 9 shows the result of the analyses of samples taken after a polymerization period of 4 h and 7 h.

TABLE 9

| Polymerization period [h] | Solids content (% by wt.) | $\bar{d}_z$ (nm) | Glass transition temperature [° C.] | $\bar{M}_w$ | PDI |
| --- | --- | --- | --- | --- | --- |
| 4 | 4.7 | — | 103.6 | 63290 | 1.43 |
| 7 | 5.3 | — | 84.8 | 75840 | 1.51 |
| 24 | 5.8 | 268 | 74.6 | 127200 | 2.00 |

Example 9

11.3 g of the N-oxyl free-radical initiator B were mixed with 56.50 g of styrene, 1.41 g of emulsifier solution 1 and 275.4 g of water, with stirring. The mixture was then homogenized using ultrasound (Branson Sonifier II 450) to give an aqueous emulsion with $\bar{d}_z$=229 nm.

The resulting aqueous emulsion was then introduced into a stirred 3 l pressure vessel and an initial pressure of 2 bar was established in this vessel by means of molecular nitrogen. Then the aqueous emulsion was heated to 130° C. and held at this temperature for 4 h. Following this, 53 g of butadiene were introduced into the pressure vessel and the polymerization was continued for a further 20 h at 130° C. and at the corresponding superatmospheric pressure. Then a pressure of 10 bar was established by means of molecular nitrogen and was subsequently let down to 4 bar (this procedure was repeated 9 times). Then 80 g of styrene were introduced into the pressure vessel, and the polymerization was continued for a further 4 h at 130° C. and at a superatmospheric pressure corresponding to an initial pressure of 2 bar. The reaction mixture was then cooled to 25° C.

A stable aqueous polymer dispersion was obtained which is characterized in Table 10.

In addition, Table 10 shows the result of the analysis after different polymerization periods.

TABLE 10

| Polymerization period [h] | Solids content (% by wt.) | $\bar{d}_z$ (nm) | Glass transition temperature [° C.] | $\bar{M}_w$ | PDI |
| --- | --- | --- | --- | --- | --- |
| 3.5 | 3.9 | 148 | 84.9 | 64920 | 1.50 |
| 6.5 | 4.6 | 220 | 64.8 | 83060 | 1.61 |
| 23.5 | 6.7 | 234 | 64.8 | — | — |
| 27.5 | 9.1 | 258 | 71.5 | 366500 | 3.88 |

The film of the resulting aqueous polymer dispersion was completely soluble in tetrahydrofuran, indicating an at best low degree of crosslinking.

Example 10

16.4 g of the N-oxyl free-radical initiator B were mixed with 82 g of styrene, 2.05 g of emulsifier solution 1 and 400 g of water, with stirring. The mixture was then homogenized using ultrasound (Branson Sonifier II 450) to give an aqueous emulsion with $\bar{d}_z$=231 nm. The resulting aqueous emul-sion was introduced into a stirred 3 l pressure vessel and diluted therein with 485 g of water. An initial pressure of 1 bar was established in this vessel by means of molecular nitrogen, and the aqueous emulsion was heated to 130° C. and held at this temperature for 4 h. Following this, 38 g of n-butyl acrylate were introduced into the pressure vessel and the polymerization was continued for a further 2 h at 130° C. and at the corresponding superatmospheric pressure. The reaction mixture was finally cooled to 25° C. A stable aqueous polymer dispersion was obtained which is characterized in Table 11. In addition, Table 11 shows the result of the analyses after different polymerization periods.

TABLE 11

| Polymerization period [h] | Solids content (% by wt.) | $\bar{d}_z$ (nm) | Glass transition temperature [° C.] | $\bar{M}_w$ | PDI |
| --- | --- | --- | --- | --- | --- |
| 4 | 4.0 | — | 103.6 | 68620 | 1.38 |
| 5 | — | — | 98 | 71730 | 1.41 |
| 24 | 5.3 | 255 | 90.8//26.8 | 128700 | 1.89 |

Example 11

40 g of the N-oxyl free-radical initiator B were mixed with 93 g of styrene, 2.66 g of emulsifier solution 1 and 645.1 g of water, with stirring. The mixture was then homogenized using ultrasound (Branson Sonifier II 450) to give an aqueous emulsion with $\bar{d}_z$=200 nm. The resulting aqueous emulsion was introduced into a stirred 3 l pressure vessel and an initial pressure of 5 bar was established in this vessel by means of molecular nitrogen. Then the aqueous emulsion was heated to 130° C. and held at this temperature for 2 h. Following this, 118 g of n-butyl acrylate, 20.05 g of styrene and 2.76 g of emulsifier solution 1 were introduced into the pressure vessel and the polymerization was continued for a further 4 h at 130° C. and at the corresponding superatmospheric pressure. The reaction mixture was finally cooled to 25° C. A stable aqueous polymer dispersion was obtained which is characterized in Table 12. In addition, Table 12 shows the result of the analysis after a polymerization period of 2 h.

TABLE 12

| Polymerization period [h] | Solids content (% by wt.) | $\bar{d}_z$ (nm) | Glass transition temperature [° C.] | $\bar{M}_w$ | PDI |
| --- | --- | --- | --- | --- | --- |
| 2 | 4.5 | 223 | 102 | 48720 | 1.41 |
| 6 | 7.6 | 253 | 19.5//88.1 | 91340 | 1.71 |

Example 12

35.55 g of the N-oxyl free-radical initiator B were mixed with 82.65 g of styrene, 2.96 g of emulsifier solution 1 and 572.15 g of water, with stirring. The mixture was then homogenized using ultrasound (Branson Sonifier II 450) to give an aqueous emulsion with $\bar{d}_z$=212 nm. The resulting aqueous emulsion was introduced into a stirred 3 l pressure vessel and an initial pressure of bar was established in this vessel by means of molecular nitrogen. Then the aqueous emulsion was heated to 130° C. and held at this temperature for 3 h. Following this, 104.9 g of n-butyl acrylate, 17.82 g of styrene and 3.07 g of emulsifier solution 1 were introduced into the pressure vessel and the polymerization was continued for a further 4 h at 130° C. and at the corresponding superatmospheric pressure. Then a solution of 0.45 g of sodium peroxodisulfate in 15 g of water was introduced into the pressure vessel and polymerization was continued at 130° C. for 1.5 h under the corresponding superatmospheric pressure. The reaction mixture was finally cooled to 25° C. A stable aqueous polymer dispersion was obtained which is characterized in Table 13 and had a residual monomer content, as determined by gas chromatography, of <100 ppm by weight, indicating a virtually quantitative polymerization conversion. In addition, Table 13 shows the result of the analyses after a polymerization period of 3 and 7 hours (while after 7 h of polymerization the molecular weight distribution was still monomodal, after 8.5 h it was bimodal, with a first maximum at about 90,000 g/mol and a second maximum at about 600,000 g/mol).

TABLE 13

| Polymerization period [h] | Solids content (% by wt.) | $\bar{d}_z$ (nm) | Glass transition temperature [° C.] | $\bar{M}_w$ | PDI |
|---|---|---|---|---|---|
| 3 | 10.3 | 271 | 97.3 | 51750 | 1.42 |
| 7 | 13.9 | 269 | 16.7//87.8 | 86370 | 1.68 |
| 8.5 | 18.5 | 265 | 14.3//84.6 | 153820 | 2.72 |

We claim:

1. A process of free-radically initiated aqueous polymerization for preparing an aqueous polymer dispersion consisting essentially of,
   i) emulsifying, in an aqueous medium by means of dispersants, a mixture consisting essentially of
      a) a monomer or monomers having at least one ethylenically unsaturated group, at least one free-radical polymerization initiator and at least one stable N-oxyl radical, or
      b) a monomer or monomers having at least one ethylenically unsaturated group, and at least one compound which under the action of heat breaks down into a stable N-oxyl radical and into a free-radical partner which initiates the polymerization, to produce an aqueous emulsion of a mixture of a) or b) whose disperse phase consists predominantly of droplets with a diameter less than 500 nm, and
   ii) polymerizing the resulting aqueous emulsion by raising its temperature.

2. A process as claimed in claim 1, wherein said aqueous emulsion comprises at least one compound whose solubility in water at 25° C. and 1 atm is less than 0.001% by weight.

3. An aqueous polymer dispersion obtained by the process claimed in claim 1.

4. An aqueous polymer dispersion obtained by the process claimed in claim 2.

5. A process as claimed in claim 1, wherein a mixture a) is used and the stable N-oxyl radical is 4-hydroxy-2,2,6,6-tetramethyl-1-oxylpiperidine, 4-hydroxy-2,6-diphenyl-2,6-dimethyl-1-oxylpiperidine, 4-carboxy-2,2,6,6-tetramethyl-1-oxylpiperidine, 4-carboxy-2,6-diphenyl-2,6-dimethyl-1-oxylpiperidine, 3-carboxy-2,2,5,5-tetramethyl-1-oxylpyrrolidine, 3-carboxy-2,5-diphenyl-2,5-dimethyl-1-oxylpyrrolidine or the sodium or potassium salt of the sulfuric monoester of 4-hydroxy-2,2,6,6-tetramethyl-1-oxylpiperidine.

6. A process as claimed in claim 5, wherein the free-radical polymerization initiator in a) is a peroxide, hydroperoxide or an azo compound.

7. A process as claimed in claim 1, wherein in a) the molar ratio of stable N-oxyl radical to free-radical polymerization initiator is from 0.5 to 5.

8. A process as claimed in claim 1, wherein a mixture b) is used and the compound which under the action of heat breaks down into a stable N-oxyl radical and into a free-radical partner which initiates the polymerization are compounds of the formula (X)

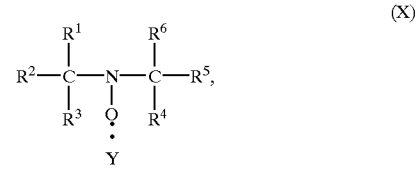

where

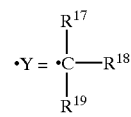

in which $R^{17}$, $R^{18}$, and $R^{19}$ are identical or different and are hydrogen or alkyl($C_1$–$C_4$), phenyl, cyano, carboxyl or substituted groups thereof; $R^1$, $R^2$, $R^5$, and $R^6$ are the same or different straight- or branched-chain, substituted or unsubstituted alkyls; and $R^3$ and $R^4$ are the same or different straight- or branched-chain, substituted or unsubstituted alkyls, or $R^3CNCR^4$ is an substituted or unsubstituted cyclic structure.

9. A process as claimed in claim 1, wherein the compound consisting essentially of a monomer or monomers is an olefin, vinyl aromatic compound, vinyl halide, vinylidene halide, ester of a vinyl alcohol with $C_1$–$C_{12}$ monocarboxylic acid, ester of allyl alcohol with $C_1$–$C_{12}$ monocarboxylic acid, ester of $C_3$–$C_6$ α,β-monoethylenically unsaturated mono- and dicarboxylic acid with $C_1$–$C_{12}$ alkanols, nitrile of α,β-monoethylenically unsaturated carboxylic acid, conjugated dienes or mixtures thereof.

* * * * *